US012609429B2

(12) United States Patent
Kim et al.

(10) Patent No.: US 12,609,429 B2
(45) Date of Patent: Apr. 21, 2026

(54) CERAMIC WAVEGUIDE FILTER INCLUDING A PLURALITY OF RESONATORS AND ULTRA-SHORT DELAY ADJUSTERS EACH FORMED BY RESPECTIVE GROOVE-SHAPED PORTIONS

(71) Applicant: KMW INC., Hwaseong-si (KR)

(72) Inventors: Jae Hong Kim, Yongin-si (KR); Jong Hyeok Park, Osan-si (KR); Yeon Ho Shin, Yongin-si (KR); Hoon Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 84 days.

(21) Appl. No.: 18/244,319

(22) Filed: Sep. 11, 2023

(65) Prior Publication Data

US 2023/0420816 A1 Dec. 28, 2023

Related U.S. Application Data

(63) Continuation of application No. PCT/KR2022/002917, filed on Mar. 2, 2022.

(30) Foreign Application Priority Data

Mar. 12, 2021 (KR) ........................ 10-2021-0032426

(51) Int. Cl.
*H01P 1/20* (2006.01)
*H01P 1/205* (2006.01)

(52) U.S. Cl.
CPC .......... *H01P 1/2002* (2013.01); *H01P 1/2053* (2013.01); *H01P 1/2056* (2013.01)

(58) Field of Classification Search
CPC ..... H01P 1/2002; H01P 1/2053; H01P 1/2056
(Continued)

(56) References Cited

U.S. PATENT DOCUMENTS

2008/0204165 A1 8/2008 Vangala et al.
2009/0231064 A1* 9/2009 Bates et al. ........... H01P 1/2088 333/208
2011/0279200 A1* 11/2011 Vangala .................... H01P 7/10 333/209

FOREIGN PATENT DOCUMENTS

CN 110400993 A 11/2019
CN 110676542 A 1/2020
(Continued)

OTHER PUBLICATIONS

Non-final Office Action mailed on Jan. 29, 2025 from the Korean Patent Office for Application No. 10-2021-0032426.
(Continued)

*Primary Examiner* — Benny T Lee

(57) ABSTRACT

A ceramic waveguide filter is disclosed. According to at least one embodiment of the present disclosure, a ceramic waveguide filter forming a plurality of resonant blocks including a ceramic dielectric is provided, including an input end and an output end each defined by a groove-shaped portion having a predetermined depth on an outer surface of the ceramic waveguide filter, a plurality of resonators each defined by a groove-shaped portion having a predetermined depth on an outer surface of each of the plurality of resonant blocks, and at least one ultra-short delay adjusters adjacent to at least one of the input end and the output end, the ultra-short delay adjuster being defined by a groove-shaped portion having a predetermined depth on the outer surface of the ceramic waveguide filter.

7 Claims, 8 Drawing Sheets

(58) Field of Classification Search
USPC .................................................. 333/202, 206
See application file for complete search history.

(56) References Cited

FOREIGN PATENT DOCUMENTS

| | | | |
|---|---|---|---|
| CN | 111342187 | A | 6/2020 |
| KR | 10-2020-0034950 | A | 4/2020 |
| KR | 10-2020-0062005 | A | 6/2020 |
| KR | 10-2127506 | B1 | 6/2020 |
| KR | 10-2021-0027060 | A | 3/2021 |
| WO | 2020/111397 | A1 | 6/2020 |

OTHER PUBLICATIONS

European Search Report mailed on Mar. 11, 2025 from European Patent Office for Application No. 22767387.8.
International Search Report mailed Jun. 3, 2022 for International Application No. PCT/KR2022/002917 and its English translation.
Korean Notice of Allowance mailed on Dec. 24, 2025 from Ministry of Intellectual Property for Application No. 10-2021-0032426 and its English translation.

* cited by examiner

CERAMIC WAVEGUIDE FILTER INCLUDING A PLURALITY OF RESONATORS AND ULTRA-SHORT DELAY ADJUSTERS EACH FORMED BY RESPECTIVE GROOVE-SHAPED PORTIONS

CROSS-REFERENCE TO RELATED APPLICATION

This application is a continuation application of International Application No. PCT/KR2022/002917, filed on Mar. 2, 2022, which claims priority from Korean Patent Application No. 10-2021-0032426 filed on Mar. 12, 2021, the disclosures of which are incorporated by reference herein in their entirety.

TECHNICAL FIELD

The present disclosure relates to a ceramic waveguide filter.

BACKGROUND

The statements in this section merely provide background information related to the present disclosure and do not necessarily constitute prior art.

The recently increasing number of wireless communication services has caused a more complex frequency environment. The frequency limitation for wireless communications requires the frequency resources to be effectively utilized by making the wireless communication channels closely spaced.

In an environment providing various wireless communication services, signal interference occurs. This signal interference requires band filters for specific bands to minimize signal interference between adjacent frequency resources.

For frequency filters that are mounted on antennas, filter fabrication comes first and is followed by tuning. One of the initial tasks in tuning is to check for ultra-short delays. The input and output ends each have neighboring resonators and loops connecting the neighboring resonators. Depending on the shape and location of the loops at the input and output, the value of the ultra-short delay at the input end and output end varies. The tuning of the ultra-short delay is significant because the ultra-short delay needs to reach the design value to achieve the desired skirt characteristics and filtered frequency bandwidth.

With air-filled cavity bandpass filters, tuning the ultra-short delay can be accomplished simply by changing the shape and location of the loop, or the tuning screw. However, dielectric ceramic waveguide filters entail spatial or structural constraints to adjust the ultra-short delay.

DISCLOSURE

Technical Problem

Accordingly, the present disclosure seeks to regulate the ultra-short delays occurring in a ceramic waveguide filter at the input and output ends.

Further, the present disclosure in some embodiments is directed to attenuating spurious waves generated when filtering a signal.

The problems to be solved by the present disclosure are not limited to the issues mentioned above, and other unmentioned problems will be clearly understood by those skilled in the art from the following description.

SUMMARY OF THE INVENTION

At least one aspect of the present disclosure provides a ceramic waveguide filter forming a plurality of resonant blocks including a ceramic dielectric, the ceramic waveguide filter including an input end and an output end each defined by a groove-shaped portion having a predetermined depth on an outer surface of the ceramic waveguide filter, a plurality of resonators each defined by a groove-shaped portion having a predetermined depth on an outer surface of each of the plurality of resonant blocks, and at least one ultra-short delay adjuster adjacent to at least one of the input end and the output end, the ultra-short delay adjuster being defined by a groove-shaped portion having a predetermined depth on an outer surface of the ceramic waveguide filter.

Additionally, at least one ultra-short delay adjuster of the ceramic waveguide filter may be configured to adjust at least one of an input ultra-short delay and an output ultra-short delay by varying at least one of a depth or a width of the groove-shaped portion defined in the ultra-short delay adjuster.

Additionally, at least one ultra-short delay adjuster of the ceramic waveguide filter may be disposed on at least one of a top surface or a bottom surface of the ceramic waveguide filter.

Additionally, the ceramic waveguide filter may further include one or more slots having a predetermined depth formed on at least one of the top surface or the bottom surface of the ceramic waveguide filter, wherein the one or more slots are provided along regions between adjacent resonant blocks among the plurality of resonant blocks.

Additionally, at least one ultra-short delay adjuster may include a groove-shaped portion partially overlapping one or more slots to form a region having a predetermined depth.

Additionally, at least one ultra-short delay adjuster may overlap with one or more slots such that a cross-section of an overlapped region has a semicircular shape.

Additionally, at least one ultra-short delay adjuster may have a cross-sectional shape of a cylindrical groove-shaped portion or an N-prismatic groove-shaped portion, wherein N is a natural number greater than or equal to 3.

Advantageous Effects

As described above, according to the present disclosure, the ceramic waveguide filter has, at a position adjacent to the input end and the output end, an ultra-short delay adjuster arranged with a groove of a predetermined depth from the outer surface of the ceramic waveguide filter, thereby regulating the ultra-short delays.

Furthermore, a slot formed between resonant blocks has the effect of attenuating spurious waves.

REFERENCE NUMERALS

Figure 1:
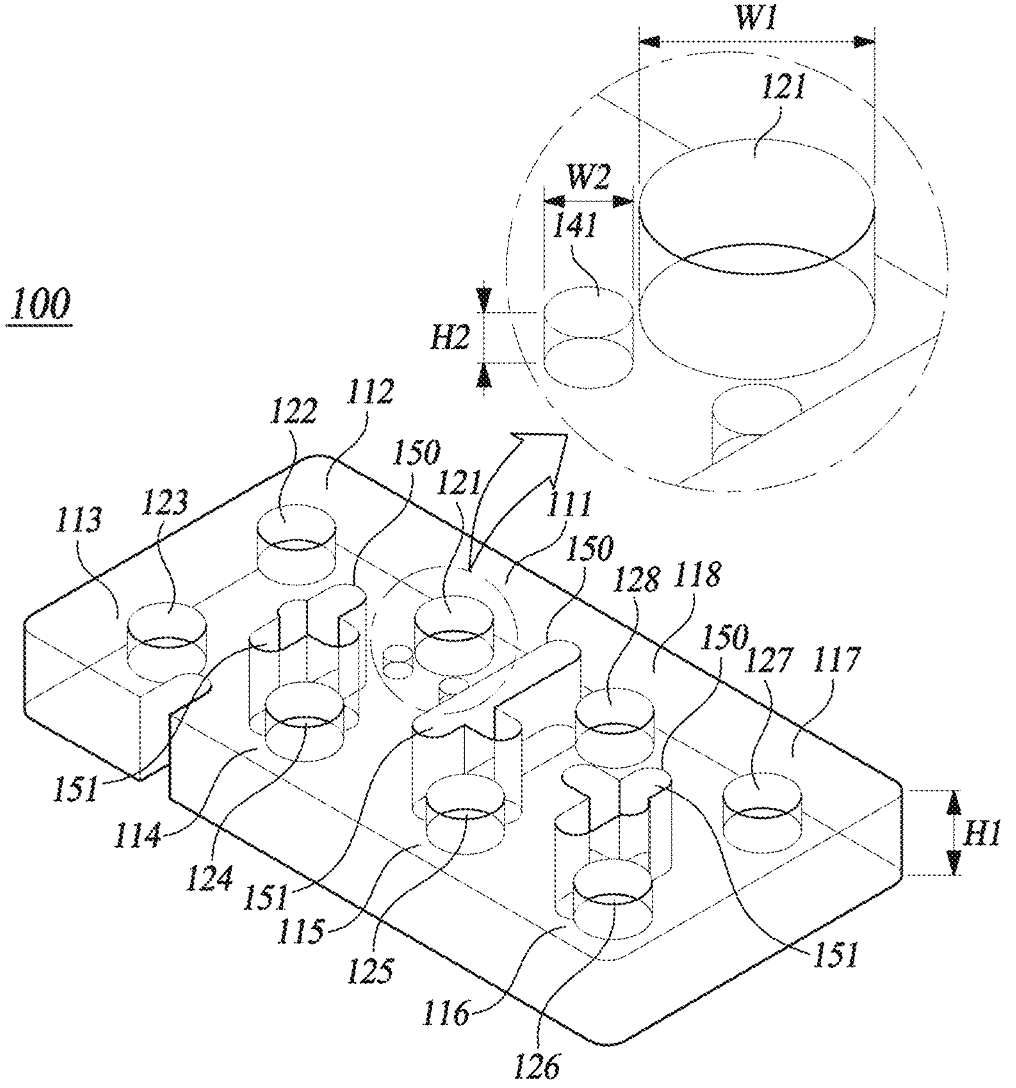
FIG. 1 is a projected perspective view of a ceramic waveguide filter according to at least one embodiment of the present disclosure.

100: ceramic waveguide filter
112: 2nd resonant block
114: 4th resonant block
116: 6th resonant block
118: 8th resonant block
122: 2nd resonator
124: 4th resonator
126: 6th resonator
128: 8th resonator
132: output end
150: partition wall
161-163: slot
111: 1st resonant block
113: 3rd resonant block
115: 5th resonant block
117: 7th resonant block
121: 1st resonator
123: 3rd resonator
125: 5th resonator
127: 7th resonator
131: input end
141-146: ultra-short delay adjuster
151: cavity

DETAILED DESCRIPTION OF THE INVENTION

Hereinafter, some embodiments of the present disclosure will be described in detail with reference to the accompanying illustrative drawings. In the following description, like reference numerals preferably designate like elements throughout the detail description, although the elements are shown in different drawings. Further, in the following description of some embodiments, a detailed description of related known components and functions when considered to obscure the subject of the present disclosure will be omitted for the purpose of clarity and for brevity.

Additionally, various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary.

FIG. 1 is a projected perspective view of a ceramic waveguide filter according to at least one embodiment of the present disclosure.

Figure 2:
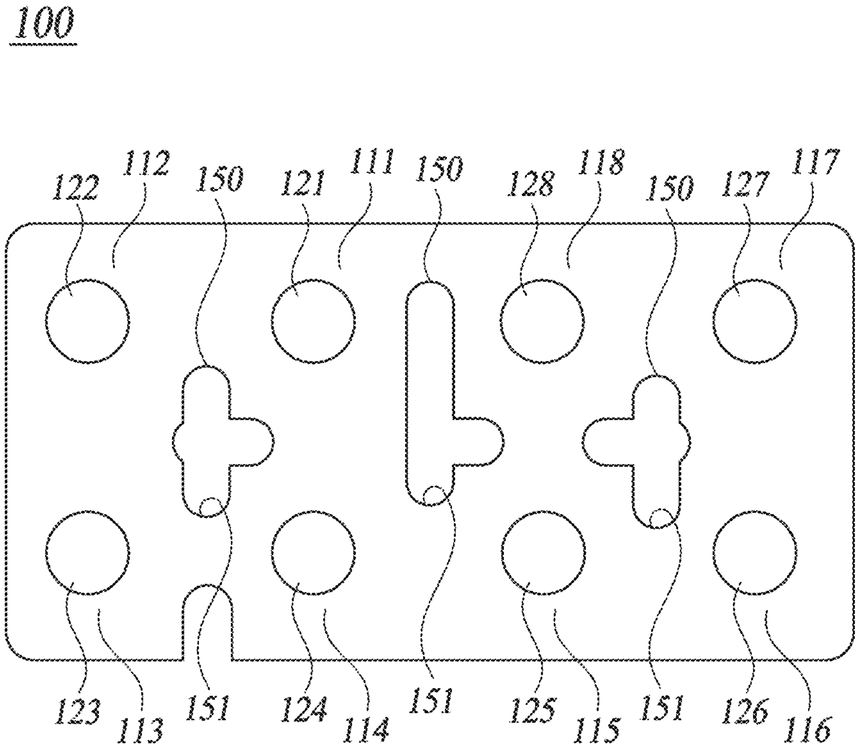
FIG. 2 is a plan view of a ceramic waveguide filter according to at least one embodiment of the present disclosure.

FIG. 2 is a plan view of a ceramic waveguide filter according to at least one embodiment of the present disclosure.

Figure 3:
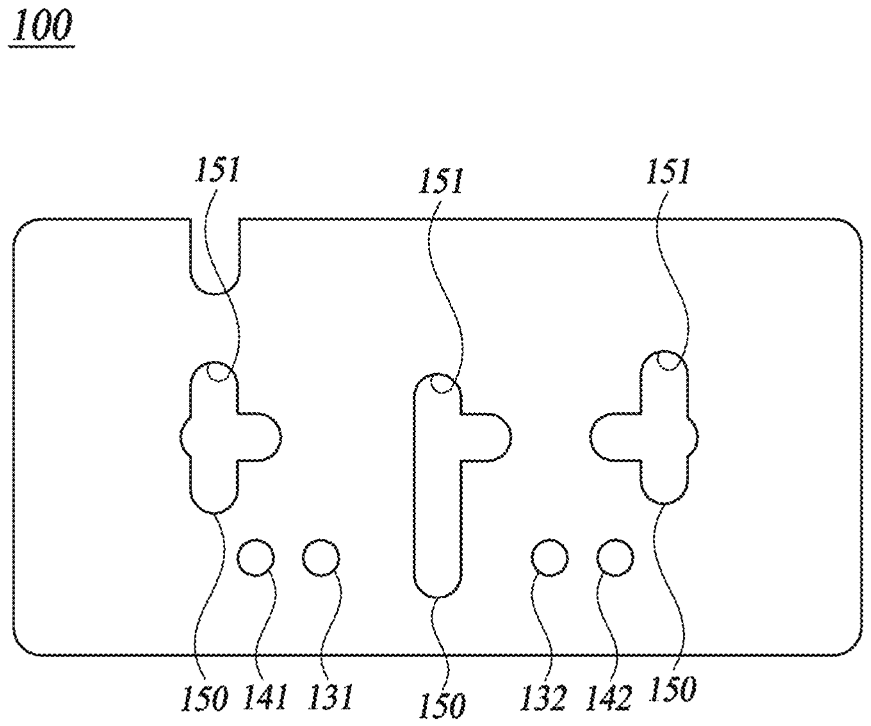
FIG. 3 is a bottom view of a ceramic waveguide filter according to at least one embodiment of the present disclosure.

FIG. 3 is a bottom view of a ceramic waveguide filter according to at least one embodiment of the present disclosure.

As shown in FIGS. 1 through 3, a ceramic waveguide filter 100 includes all or part of an input end 131, an output end 132 (as shown in FIG. 3), resonant blocks 111, 112, 113, 114, 115, 116, 117, 118 (as shown in FIGS. 1 and 2), resonators 121, 122, 123, 124, 125, 126, 127, 128 (as shown in FIGS. 1 and 2), ultra-short delay adjusters 141 and 142 (as shown in FIG. 3), and a tuning unit (not shown). The ceramic waveguide filter 100 may be in the form of a hexahedron as shown in FIG. 1, but may be formed in various shapes depending on the number of resonators 121 to 128 and the shape of their connections, without limitation. The ceramic waveguide filter 100 may be formed in the shape of a hexahedron with no off-sets between each of the resonant blocks 111 to 118 as a single piece, which may simplify the fabrication process and improve productivity. The ceramic waveguide filter 100 has a height H1 (FIG. 1) that may be from 5.5 mm to 6.5 mm.

The input end 131 and output end 132 may be formed on one side of the ceramic waveguide filter 100, while the plurality of resonators 121 to 128 may be formed on a side different from the side on which the input end 131 and output end 132 are formed. The input end 131 and output end 132 may be implemented in the form of grooves having a predetermined depth on the outer surface of the ceramic waveguide filter 100. The plurality of resonators 121 to 128 may be defined by a groove-shaped portion having a predetermined depth on the outer surface of the ceramic waveguide filter 100, with respective resonant blocks being defined separately by partition walls 150. The grooves implementing the plurality of resonators 121 to 128 may have, but are not limited to, a columnar shape as shown in FIG. 1, and may be implemented in various shapes other than columnar. The plurality of resonators 121 to 128 may each have a width W1 (FIG. 1) of from 3.5 mm to 4.5 mm.

The input end 131 and output end 132 are input and output ports through which signals are inputted to the ceramic waveguide filter 100 and signals that have passed through the ceramic waveguide filter 100 are outputted. The input end 131 and output end 132 may be formed as a surface mount structure. Additionally, grooves may be formed in the input end 131 and output end 132. The grooves of input end 131 and output end 132 may be disposed in positions corresponding to the first or eighth resonator 121 or 128 disposed on opposite sides of the ceramic waveguide filter 100. The size of the grooves of the input end 131 and output end 132 may be smaller than the size of the grooves of the corresponding first or eighth resonators 121 or 128. The grooves of input end 131 and output end 132 may have connectors insertionally coupled thereto, which may be connected to signal wires constituting the connectors. The signal wires may be enveloped by a polytetrafluoroethylene (PTFE) coating.

The ceramic waveguide filter 100 may be composed of multiple resonant blocks 111 to 118 each formed with a corresponding resonator. In FIG. 1, eight resonant blocks 111 to 118 are configured with eight resonators 121 to 128, but the number of resonant blocks 111 to 118 and resonators 121 to 128 is not limited.

In FIG. 1, the eight resonators 121 to 128 are defined as the first resonator to the eighth resonator 121 to 128, respectively. The first resonator 121 may be formed at a position on the corresponding other side of the input end 131. Namely, a groove of the first resonator 121 may be formed with a predetermined height on the opposite side of the position where the input end 131 is formed.

Referring to the ceramic waveguide filter 100 shown in FIG. 1, the following will be described. The second resonator 122 extends in a first direction of the first resonator 121, and the third resonator 123 is formed by extending in a second direction of the second resonator 122. The fourth resonator 124 extends in the second direction of the third resonator 123, and the fifth resonator 125 is formed by extending in the second direction of the fourth resonator 124. The sixth resonator 126 extends in the second direction of the fifth resonator 125, and the seventh resonator 127 is formed by extending in a third direction of the sixth resonator 126. The eighth resonator 128 is formed by extending in a fourth direction of the seventh resonator 127.

The eighth resonator 128 is formed at a position on the other side corresponding to the output end 132. For example, a groove of the eighth resonator 128 may be formed with a predetermined height on the opposite side of the position where the output end 132 is formed. Each pair of the resonators 121 to 128 may be separated from each other by a partition wall 150. The space enclosed by each partition wall 150 may be composed of a hollow cavity 151.

The signal inputted from the input end 131 is filtered as it passes sequentially from the first resonator 121 through the eighth resonator 128 and is outputted to the output end 132. For example, when a signal to be filtered is inputted through the input end, the input signal is resonated by the first resonator 121 of the first resonant block 111 and then passed through the open section by coupling to the second resonator 122 of the adjacent second resonant block 112. Thereafter, a filtered signal may be outputted via the output end after being sequentially transmitted to the third resonator 123 of the third resonant block 113, the fourth resonator 124 of the fourth resonant block 114, the fifth resonator 125 of the fifth resonant block 115, the sixth resonator 126 of the sixth resonant block 116, the seventh resonator 127 of the seventh resonant block 117, and the eighth resonator 128 of the eighth resonant block 118 by coupling in each open section. The adjacent resonators may be coupled by inductive coupling or capacitive coupling.

In the ceramic waveguide filter, the first direction and the second direction are perpendicular to each other, the third direction is at right angles to the second direction and opposite the first direction, and the fourth direction is at right angles to the first direction and opposite the second direction.

The number and arrangement of the plurality of resonators 121 to 128 and the plurality of resonant blocks 111 to 118 shown in FIG. 1 are exemplary and not limited to those as illustrated.

The ultra-short delay adjusters 141 and 142 are groove-shaped structures disposed adjacent to the input end 131 or output end 132 and formed with a predetermined depth on the outer surface of the ceramic waveguide filter 100. The grooves of the ultra-short delay adjusters 141 and 142 may have a depth H2 (FIG. 1) of 0.5 mm to 1 mm. The grooves of the ultra-short delay adjusters 141 and 142 may have a width W2 (FIG. 1) of 1.5 mm to 2 mm. One or more of the ultra-short delay adjusters 141 and 142 may be formed.

The ultra-short delay adjusters 141 and 142 are formed in the shape of grooves having a predetermined length around the input end 131 and output end 132 to adjust the ultra-short delay of the signals originating from the input end 131 and output end 132. The ultra-short delay adjusters 141 and 142 are spaced apart at a predetermined interval from the input end 131 or output end 132, and the ultra-short delay may vary depending on the interval at which they are spaced apart. Further, the ultra-short delay may be affected not only by the position of the ultra-short delay adjusters 141 and 142 but also by the depth of the ultra-short delay adjusters 141 and 142 and the shape and size of the cross-sectional area of the ultra-short delay adjusters 141 and 142. This means that the ultra-short delay adjusters 141 and 142 may adjust the dynamic range of the input ultra-short delays or the output ultra-short delays depending on the depth of the groove-shaped portions formed, respectively. Further, the ultra-short delay adjusters 141 and 142 may adjust the dynamic range of the input ultra-short delays or the output ultra-short delays according to the width of the groove-shaped portions formed, respectively. For example, when the ultra-short delay adjusters 141 and 142 have a circular groove shape as shown in FIG. 3, the dynamic range of the ultra-short delays may be regulated by adjusting the width of the ultra-short delay adjusters 141 and 142, Even if the ultra-short delay adjusters 141 and 142 have a polygonal cross-section rather than a circular cross-section, the dynamic range of the ultra-short delays may be regulated by adjusting the width of the polygon.

Figure 4:
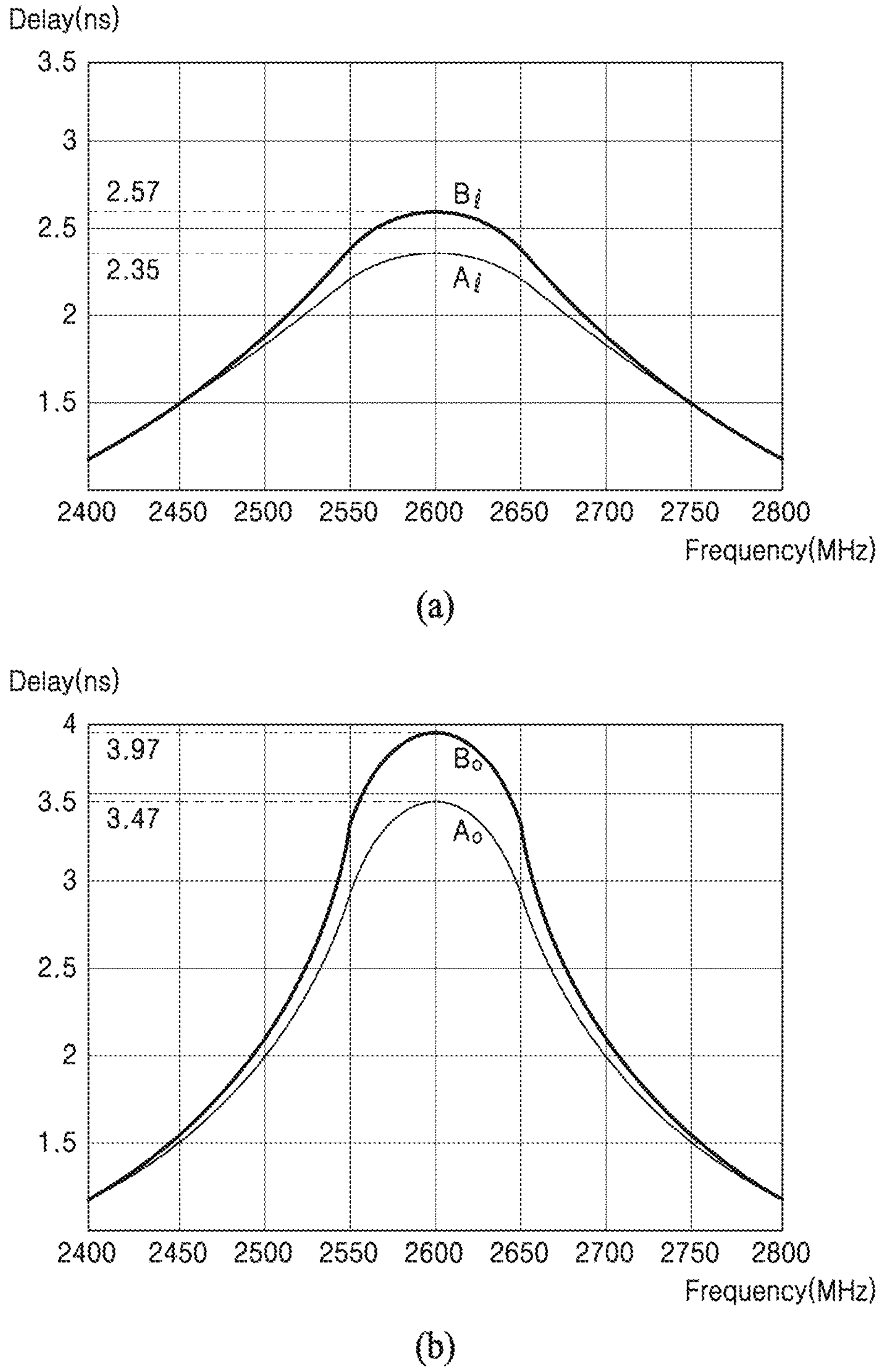
FIG. 4 illustrates graphs of the effect of adjusting the ultra-short delay by ultra-short delay adjusters.

FIG. 4 illustrates graphs showing the effect of adjusting the ultra-short delay by ultra-short delay adjusters 141 and 142. FIG. 4(*a*) shows a graph of input ultra-short delays, and FIG. 4(*b*) shows a graph of output ultra-short delays, each representing delay (ns) versus frequency (MHz). In FIG. 4(*a*), the lines Ai and Bi represent the input ultra-short delay characteristics with delay values of 2.35 ns and 2.57 ns, respectively. In FIG. 4(*b*), the lines Ao and $B_o$ represent the output ultra-short delay characteristics with delay values of 3.47 ns and 3.97 ns, respectively.

Referring to FIG. 4(*a*), there is shown a line Ai representing the input ultra-short delay when the ceramic waveguide filter 100 is without the ultra-short delay adjusters 141 and 142, and a line Bi representing the input ultra-short delay when the ceramic waveguide filter 100 includes the ultra-short delay adjusters 141 and 142 (as shown in FIG. 3). Based on a frequency of 2600 MHz, an input ultra-short delay of 2.35 ns occurred without the ultra-short delay adjusters 141 and 142, and an input ultra-short delay of 2.57 ns occurred with the ultra-short delay adjusters 141 and 142. There was a difference of 0.22 ns in the input ultra-short delays depending on the presence or absence of the ultra-short delay adjusters 141 and 142.

Referring to FIG. 4(*b*), there is shown a line Ao representing the output ultra-short delay when the ceramic waveguide filter 100 is without the ultra-short delay adjusters 141 and 142, and a line $B_o$ representing the output ultra-short delay when the ceramic waveguide filter 100 includes the ultra-short delay adjusters 141 and 142. Based on a frequency of 2600 MHZ, an output ultra-short delay of 3.47 ns occurred without the ultra-short delay adjusters 141 and 142, and an output ultra-short delay of 3.97 ns occurred with the ultra-short delay adjusters 141 and 142. There was a 0.50 ns difference in the output ultra-short delays depending on the presence or absence of the ultra-short delay adjusters 141 and 142.

Figure 7:
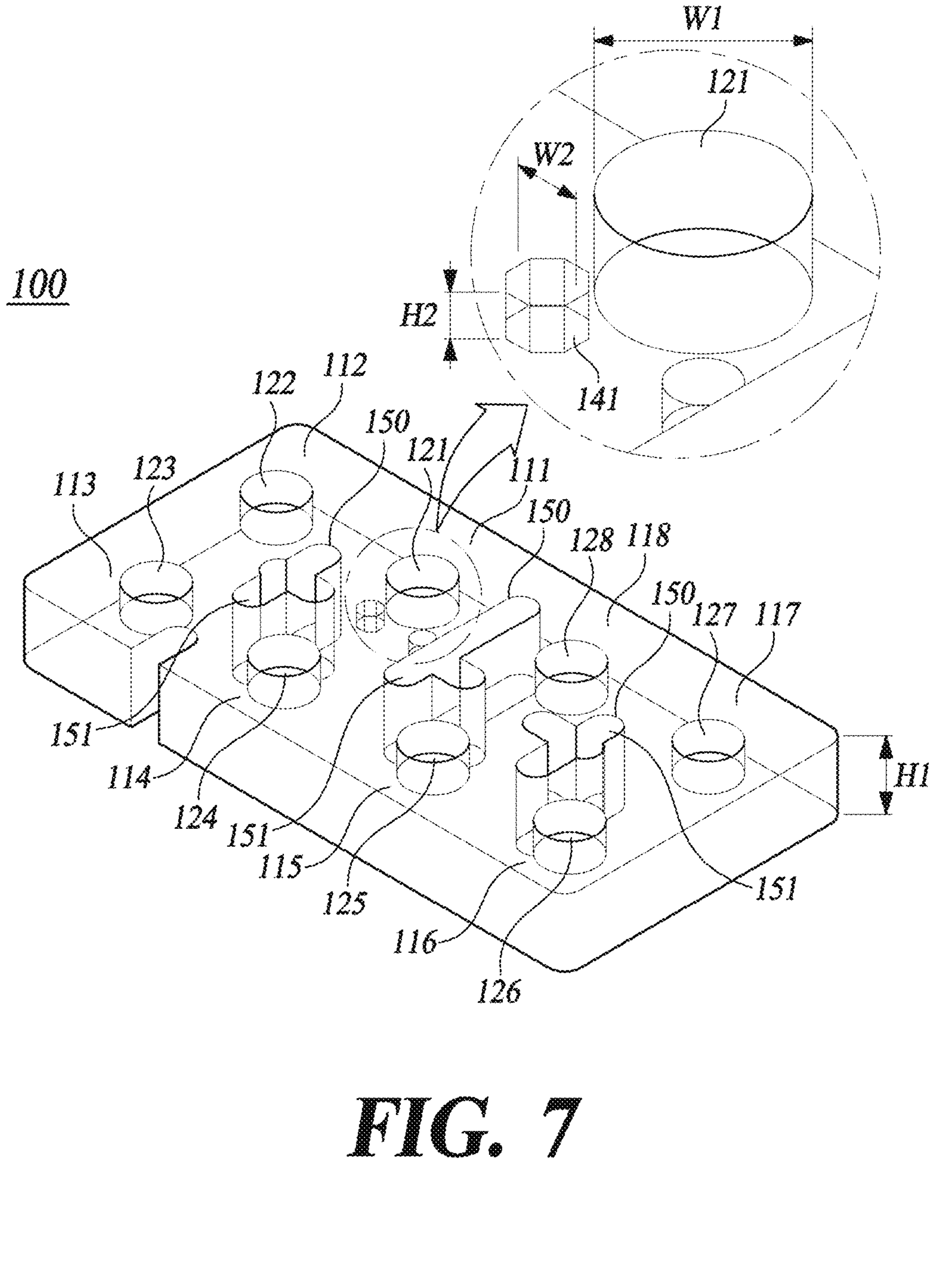
FIG. 7 illustrates an example cross-sectional shape of the ultra-short delay adjuster having an N-prismatic groove-shaped portion.
Figure 8:
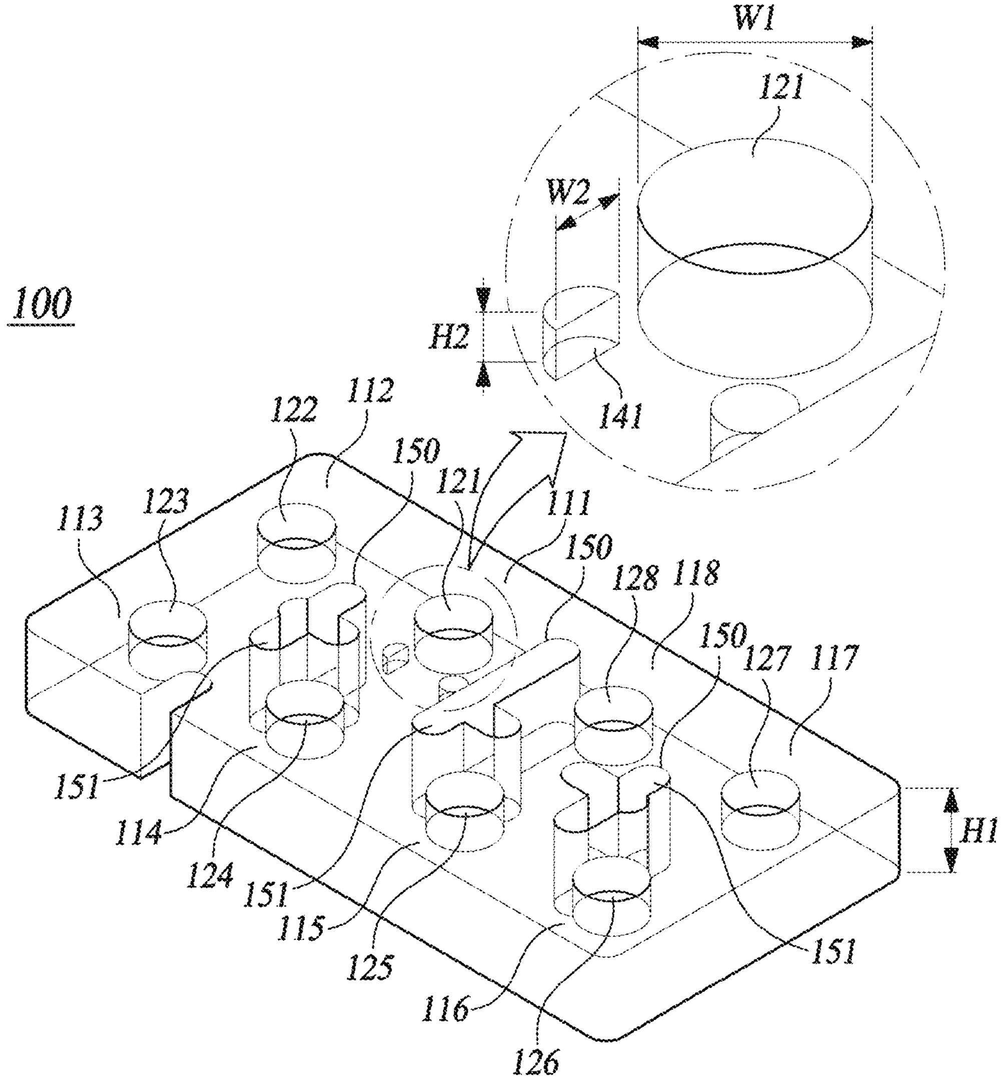
FIG. 8 illustrates an example cross-sectional shape of the ultra-short delay adjuster having a semicircular groove-shaped portion.

As shown in FIGS. 7 and 8, the ultra-short delay adjusters 141 may have various shapes. Although FIGS. 1 to 3 illustrate the ultra-short delay adjusters 141 and 142 adjacent to the input end 131 and output end 132 as being arranged in the form of a groove-shaped portion, the arrangement position, shape, and number of the ultra-short delay adjusters 141 and 142 may be varied to successfully adjust the ultra-short delay. For example, the ultra-short delay adjusters 141 and 142 may be formed not only in the form of a cylindrical groove-shaped portion, but also of an N prismatic or N-sided groove-shaped portion (where N is a natural number greater than or equal to 3), and may have a semicircular cross-section. Further, the ultra-short delay adjusters 141 and 142 may each be configured to change the size of the cross-sectional area as it moves away from the outer surface of the ceramic waveguide filter 100.

As shown in the graphs illustrated in FIG. 4, it has been determined that the input ultra-short delay and output ultra-short delay can be adjusted by arranging the ultra-short delay adjusters 141 and 142. The values of the input ultra-short delay shown in FIG. 4 are exemplary and not limiting.

Additionally, the ceramic waveguide filter 100 may further include a tuning unit (not shown) corresponding in shape to the ultra-short delay adjusters 141 and 142. The tuning unit (not shown) is configured to make follow-up adjustments to the ultra-short delay after the fabrication of the ceramic waveguide filter 100. The tuning unit (not shown) may be one or more depending on the number of ultra-short delay adjusters 141 and 142 arranged. The tuning unit (not shown) may be used to tune the input ultra-short delay and the output ultra-short delay by adjusting the space between the ultra-short delay adjusters 141 and 142.

Figure 5:
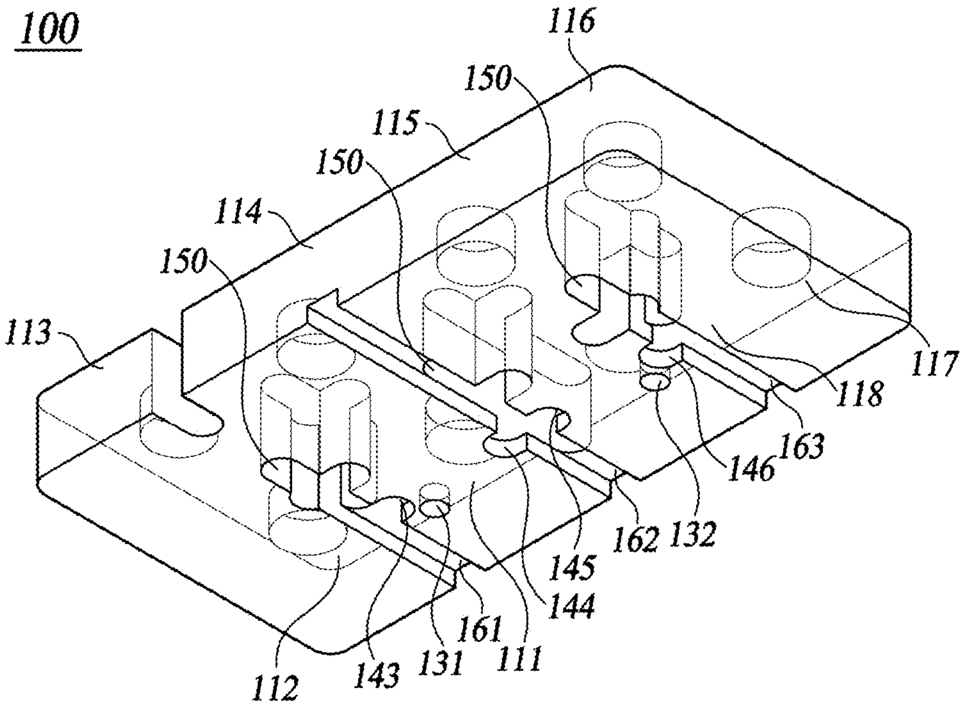
FIG. 5 is a projected perspective view of a ceramic waveguide filter according to another embodiment of the present disclosure.

FIG. 5 is a projected perspective view of a ceramic waveguide filter, according to another embodiment of the present disclosure.

Referring to FIG. 5, the ceramic waveguide filter may further include slots 161, 162, and 163. Here, the slots 161, 162, and 163 may be formed with a predetermined depth in at least some of the regions between adjacent resonant blocks and may be disposed on one or more of the top and bottom surfaces of the ceramic waveguide filter 100.

In FIG. 5, slots 161, 162, and 163 are disposed in a space between first resonant block 111 and second resonant block 112, a space between first resonant block 111 and eighth resonant block 118, a space between fourth resonant block 114 and fifth resonant block 115, and a space between seventh resonant block 117 and eighth resonant block 118. This is exemplary, and slots 161, 162, and 163 may be disposed on the top or bottom surface anywhere between neighboring resonant blocks.

In FIG. 5, the slots are only formed vertically with reference to the drawing, but may also be formed horizontally, such as between the second resonant block 112 and the third resonant block 113. The slots 161, 162, and 163 do not necessarily have to be in a straight line shape as shown in FIG. 5, and may therefore be formed in a curved shape or the like. Furthermore, the slots 161, 162, and 163 may be formed in a right-angled shape or a cross-shape.

The shape of the grooves cut to form the slots 161, 162, and 163 is also not limited. For example, the floors of the slots 161, 162, and 163 may be flat or concave in shape.

When the multiple slots 161, 162, and 163 are arranged in the ceramic waveguide filter 100, the depth or width of the grooves in each of the slots 161, 162, and 163 may differ from each other.

When the slots 161, 162, and 163 and the plurality of ultra-short delay adjusters 143, 144, 145 and 146 are disposed on the same side, some may be overlapped. As shown in FIG. 5, the four ultra-short delay adjusters 143 to 146 may overlap with the slots 161, 162, and 163 to form a semicircular cross-sectional shape. The cross-sectional shape of the four ultra-short delay adjusters 143 to 146 and the extent to which they overlap are not limited.

By further arranging one or more slots 161, 162, and 163 in the ceramic waveguide filter 100, the present disclosure may have the effect of reducing the level of spurious components.

Figure 6:
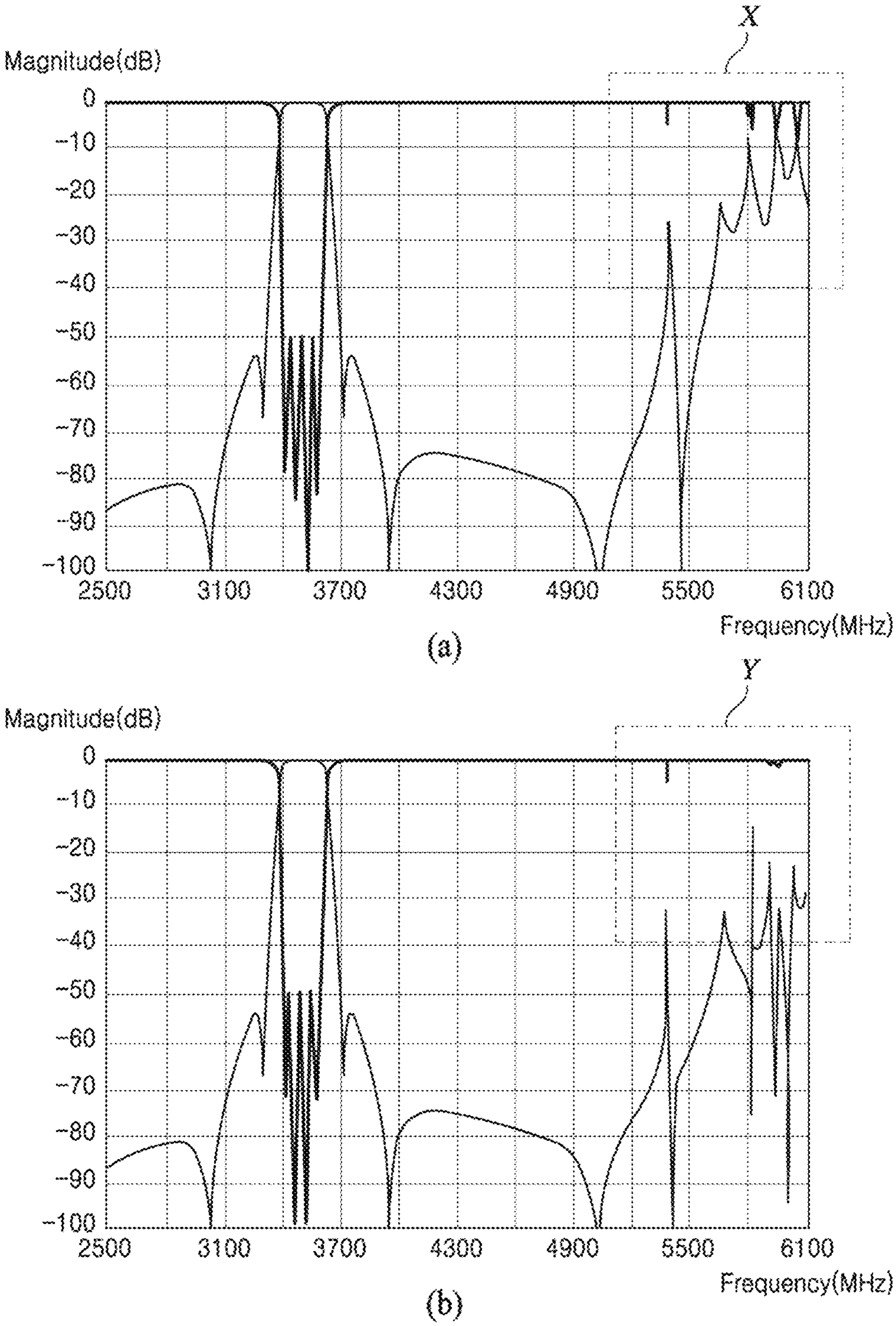
FIG. 6 illustrates graphs of the effect of attenuating spurious waves by slots arranged.

FIG. 6 illustrates graphs of the effect of attenuating spurious waves by slots arranged. FIGS. 6(*a*) and 6(*b*) show graphs of magnitude (dB) versus frequency (MHz) representing the frequency response characteristics of the ceramic waveguide filter 100.

In FIG. 6, (a) is a graph illustrating the frequency components that were filtered without the separate slots 161, 162, and 163 being arranged in the ceramic waveguide filter 100, and (b) is a graph illustrating the frequency components that were filtered with one or more slots 161, 162, and 163 being arranged in the ceramic waveguide filter 100 of FIG. 5.

In the respective graphs illustrated in FIG. 6(*a*) and FIG. 6(*b*), a comparison of the X and Y bands of the spurious wave sections reveals a difference in the effectiveness of the spurious wave attenuation. In particular, when comparing spurious waves having a frequency component between 5500 MHz and 6100 MHz, it can be seen that the magnitude of such spurious waves is reduced to about-9 dB or less in the X section, while the magnitude of such spurious waves is reduced to about-15 dB or less in the Y section. The placement of slots 161, 162, and 163 alone reduced the level of spurious waves.

Referring to FIG. 2 and FIGS. 6(*a*) and 6(*b*), FIG. 2 illustrates the structure of a ceramic waveguide filter 100 including resonant blocks 111 and 118, and FIGS. 6(*a*) and 6(*b*) show the measured frequency response characteristics of the same filter structure. In the ceramic waveguide filter 100, an additional low pass filter (LPF) may typically be placed to remove spurious waves, but that requires physical space and has the disadvantage of increasing impedance matching or insertion loss. In addition, the implementation of an LPF is more difficult in a ceramic waveguide filter due to spatial constraints. In the present disclosure, the level of spurious waves can be reduced by forming slots with a predetermined depth at the boundary between the respective resonant blocks 111 and 118 without a separate LPF.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. A ceramic waveguide filter forming a plurality of resonant blocks including a ceramic dielectric, the ceramic waveguide filter comprising:

an input end and an output end each defined by a groove-shaped portion having a predetermined depth on an outer surface of the ceramic waveguide filter;

a plurality of resonators each defined by a groove-shaped portion having a predetermined depth on an outer surface of each of the plurality of resonant blocks; and at least one ultra-short delay adjusters adjacent to at least one of the input end and the output end, the ultra-short delay adjuster being defined by a groove-shaped portion having a predetermined depth on the outer surface of the ceramic waveguide filter.

2. The ceramic waveguide filter of claim 1, wherein the at least one ultra-short delay adjuster is configured to adjust a dynamic range of at least one of an input ultra-short delay and an output ultra-short delay by varying at least one of a depth or a width of the groove-shaped portion defined in the at least one ultra-short delay adjuster.

3. The ceramic waveguide filter of claim 1, wherein the at least one ultra-short delay adjusters is disposed on at least one of a top surface or a bottom surface of the ceramic waveguide filter.

4. The ceramic waveguide filter of claim 1, further comprising:

one or more slots having a predetermined depth formed on a bottom surface of the ceramic waveguide filter, wherein the one or more slots are provided along regions between adjacent resonant blocks among the plurality of resonant blocks.

5. The ceramic waveguide filter of claim 4, wherein the at least one ultra-short delay adjusters includes a groove-shaped portion partially overlapping at least one of the slots to define an overlapped region having a predetermined depth.

6. The ceramic waveguide filter of claim 5, wherein the at least one ultra-short delay adjusters overlaps with at least one of the slots such that a cross-section of the overlapped region has a semicircular shape.

7. The ceramic waveguide filter of claim 1, wherein the at least one ultra-short delay adjuster has a cross-sectional shape of a cylindrical groove-shaped portion or an N-prismatic groove-shaped portion, wherein N is a natural number greater than or equal to 3.

* * * * *